3,567,766
PREPARATION OF METHYL ACETATE
Richard E. Crocker, Anaheim, and John W. Wagner, Westminster, Calif., assignors to Atlantic Richfield Company, Philadelphia, Pa.
No Drawing. Filed Feb. 28, 1968, Ser. No. 708,757
Int. Cl. C07c 67/00
U.S. Cl. 260—491                                6 Claims

ABSTRACT OF THE DISCLOSURE

A process for reacting methyl alcohol with vinyl chloride in the liquid phase in the presence of a $PdCl_2$ catalyst to produce methyl acetate is disclosed.

BACKGROUND OF THE INVENTION

Field of the invention

This invention relates to synthesis of esters and more particularly to the synthesis of methyl esters such as methyl acetate by reaction of methyl alcohol with vinyl chloride.

Description of the prior art

Palladium chloride has become a popular catalyst material and reactant for preparing carbonyl and carboxyl compounds. For example, Smidt et al., Angew. Chem. Internat. Edit., vol. 1, pp. 80–88 (1962) have described a process for producing acetaldehyde by catalytic oxidation of ethylene. Moiseev et al., Doklady Akademii Nauk SSSR, vol. 133, pp. 377–380 (1960) have considered a similar reaction and have described processes for producing vinyl acetate, vinyl ethers and acetals.

Stern et al., J. of Catalysis, vol. 6, pp. 152–153 (1966) have described a process for producing acetals by the reaction of vinyl chloride with isopropyl alcohol in the presence of palladium chloride. It would be predicted, especially from the latter process, that vinyl chloride would react with methyl alcohol, in the presence of palladium chloride, to produce 1,1-dimethoxyethane.

Pursuant to the foregoing teachings of the known prior art, the present reaction was conducted in the expectation that vinyl chloride would react with methyl alcohol in the presence of the $PdCl_2$ catalyst to produce the acetal, 1,1-dimethoxyethane. Contrary to expectation, methyl acetate was produced in substantial yield. It is, accordingly, an object of this invention to provide a novel method for producing esters, methyl esters such as methyl acetate in particular, by catalytic oxidation of a vinyl halide type compound in an alcohol.

SUMMARY OF THE INVENTION

It has been found that low molecular weight alcohols, and in particular methyl alcohol, will react, in the presence of palladium chloride, with a vinyl halide such as vinyl chloride to produce an ester. It is, accordingly, a principal object of the invention to provide a novel method for producing esters.

A more specific object of the invention is to provide a method for producing lower alkyl esters.

An additional specific object of the invention is to provide a process for producing esters by reacting alcohols with vinyl halides.

A still more specific object of the invention is to provide a method for producing methyl esters.

A further and still more specific object of the invention is to provide a method for producing methyl acetate by reacting methyl alcohol with vinyl chloride.

Other objects of the invention will be apparent from the specification which follows.

DESCRIPTION OF THE PREFERRED EMBODIMENTS

As indicated previously herein, the experimental work leading to the present invention was not undertaken with the view of producing esters. Indeed, the production of esters in any yield was a most unexpected development. Following the teachings of Stern et al., supra, it was hoped that, if the reaction conditions could be optimized, dimethyl acetal in good yield might be produced by reacting vinyl chloride with methyl alcohol over palladium chloride in the liquid phase. Accordingly, except for the substitution of methyl alcohol for isopropyl alcohol, it was intended to duplicate the run reported by Stern et al., in the above cited publication. Dimethyl acetal is a precursor to methyl vinyl ether, a known and commercially used monomer for producing synthetic coating materials, and it was hoped that economically attractive yields of dimethyl acetal for production of methyl vinyl ether could be obtained by the reaction of vinyl chloride with methyl alcohol. To our surprise and initial disappointment, however, dimethyl acetal was not the sole product, and often not even the major product.

Equally to our surprise, however, analysis of the reaction products indicated the presence of methyl acetate in substantial quantities. In view of the value and utility of methyl acetate as a solvent for nitrocellulose, acetylcellulose, cellulose esters, etc., as an extract for vegetable materials and in paints and varnishes generally, it was concluded that the reaction may be of value in producing methyl acetate and other esters. Accordingly, preliminary work was undertaken to further explore the reaction. Optimum reaction conditions to produce maximum yields of the ester have not, to date, been determined, however.

The production of an ester in the manner of this reaction was not expected and is not predictable according to any accepted reaction mechanism of which we are aware. Indeed, we are unable to hypothesize a reaction mechanism which would fully explain the production of an ester. It was determined, however, that the ester is not formed from the acetal since when the acetal is reacted with methyl alcohol under identical conditions, in the absence of vinyl chloride, no methyl acetate is found.

The process of the invention comprises the reaction of a low molecular weight alcohol, preferably a primary alcohol such as methyl alcohol, with a vinyl halide having the structure

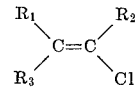

wherein $R_1$, $R_2$ and $R_3$ are preferably hydrogen or lower alkyl, in the liquid phase in contact with $PdCl_2$ at temperatures from about 0° C. to about 150° C. for from about 24 hours to about 72 hours. Where the vinyl halide is vinyl chloride, the pressure may be from one atmosphere to about ten atmospheres.

The invention is illustrated by the following examples, which are not intended to limit the scope of the invention.

EXPERIMENTAL

In the initial experiment (554–14) which resulted in the production of methyl acetate 50 ml. of the solvent, isooctane, .06 mole of $CH_3OH$, .08 mole of $Na_2HPO_4$ (as a buffer and HCl absorber) and .02 mole of $PdCl_2$ were introduced into a 150 ml. aerosol compatibility flask equipped with a stirring bar. The flask was pressurized with vinyl chloride to a pressure of 2 atmospheres and the reaction mixture was stirred at 25° C. for 72 hours. The product mixture was analyzed by mass spectroscopy and gas chromatography. Analysis indicated 100 percent conversion of the methyl alcohol. The yields, in mole percent, were: 1,1-dimethoxyethane, 87 percent, and methyl acetate, 13 percent.

The above experiment was duplicated (554-26) except that the palladium catalyst material was reduced by a factor of 10 to .002 mole and the reaction time was 48 hours. The conversion to the ester was quite low but the yield of methyl acetate was twice the yield of the acetal. The respective yields were: 1,1-dimethoxyethane, 0.5 percent, and methyl acetate 1 percent.

An experiments was run to determine the effect of temperature and pressure on the reaction. Run 554-26 was repeated except that a temperature of 130° C. and a pressure of 100 p.s.i.g. was maintained for 48 hours. The yields were: 1,1-dimethoxyethane 1 percent and methyl acetate 1 percent.

While anhydrous reagents had been used throughout the series of experiments it was postulated that perhaps the reaction could be explained by the presence of traces of water in the reaction system. Accordingly, a run (591-4) was made wherein all of the reagents and the apparatus was thoroughly dried to exclude the presence of water vapor. The conditions of run 554-14 were repeated except that the reaction time was 48 hours.

Analysis of the products gave the following yields: 1,1-dimethoxyethane, 63 percent, and methyl acetate, 7 percent.

The results of these experiments are shown in Table I.

TABLE I

| Experiment No. | Temp., °C. | Pressure, p.s.i.g. | $PdCl_2$, moles/mole $CH_3OH$ | Product, mole percent $CH_3OH$ converted to— | |
|---|---|---|---|---|---|
| | | | | 1,1-dimethoxyethane | Methyl acetate |
| N544-14 | 25 | 30 | 0.3 | 87 | 13 |
| N544-26 | 25 | 30 | 0.03 | 0.5 | 1 |
| N544-33 | 130 | 100 | 0.03 | 1 | 1 |
| N591-4 a | 25 | 30 | 0.3 | 63 | 7 | a Reagents thoroughly dried prior to reaction.

The reaction conditions of run 591-4 was duplicated except that 1,1-dimethoxyethane was initially introduced into the reaction vessel and the vessel was inertly pressurized. This run was made to determine if the acetal was being converted to the ester. Analysis of the product, however, indicated the absence of the ester.

Lower molecular weight alcohols and homologs of vinyl chloride are, for the purposes of the present invention, regarded as equivalents to methyl alcohol and vinyl chloride. The substitution of such equivalent reactants and other modifications would be obvious from the foregoing description of the present invention to one having ordinary skill in the art and such substitutions and modifications are within the spirit and scope of the invention.

We claim:

1. A method for producing methyl acetate comprising reacting methyl alcohol and vinyl chloride in the presence of palladium chloride, at from about 0° C. to about 150° C. at from about 1 to about 10 atmospheres in liquid phase.

2. The reaction of claim 1 wherein the reactants are supported in a hydrocarbon solvent.

3. The reaction of claim 1 wherein the temperature is maintained between approximately 0° C. and 130° C.

4. The reaction of claim 1 wherein the reaction is conducted in the presence of a phosphate buffer.

5. The method of claim 4 wheren the phosphate buffer is selected from the group consisting of alkali metal or alkaline earth metal hydrogen phosphate.

6. The method of claim 5 wherein phosphate buffer is sodium phosphate.

References Cited

UNITED STATES PATENTS 3,479,392  11/1969  Stern et al. _____ 260—497

LORRAINE A. WEINBERGER, Primary Examiner

V. GARNER, Assistant Examiner

U.S. Cl. X.R.

260—496, 615